United States Patent [19]

Glancy

[11] 3,926,249
[45] Dec. 16, 1975

[54] ENERGY RECOVERY SYSTEM
[76] Inventor: Walter P. Glancy, 7120 Baxtershire, Dallas, Tex. 75230
[22] Filed: Dec. 11, 1973
[21] Appl. No.: 423,844

[52] U.S. Cl. .................................. 165/3; 165/39
[51] Int. Cl.² ............................................ F24F 3/14
[58] Field of Search ............ 165/1, 2, 3, 39, 40, 29, 165/16, 22, 50, 66; 62/242

[56] References Cited
UNITED STATES PATENTS
| | | | |
|---|---|---|---|
| 1,409,520 | 3/1922 | Bird | 165/66 |
| 2,401,560 | 6/1946 | Graham et al. | 165/29 |
| 3,526,967 | 9/1970 | Bolz | 165/16 |

*Primary Examiner*—Charles J. Myhre
*Assistant Examiner*—W. C. Anderson
*Attorney, Agent, or Firm*—Howard E. Moore; Gerald G. Crutsinger

[57] ABSTRACT

A method and apparatus to recover energy from used or foul air and to return the energy into fresh air to reduce the energy input to a ventilation system. Ventilator apparatus is adapted to maintain fluid flow through a first heat exchanger, positioned in a fresh air passage, and through a second heat exchanger, positioned in an exhaust passage, at a controlled rate to afford maximum or controlled heat transfer efficiency for pre-cooling or pre-heating fresh air drawn into the system. Control apparatus is provided to maintain flow of fluid through the heat exchangers such that the sum of the mass flow of fresh air times the specific heat of the fresh air, plus the mass flow of the exhaust air times the apparent specific heat of exhaust air, is equal to two times the mass flow of fluid times the specific heat of the fluid.

7 Claims, 9 Drawing Figures

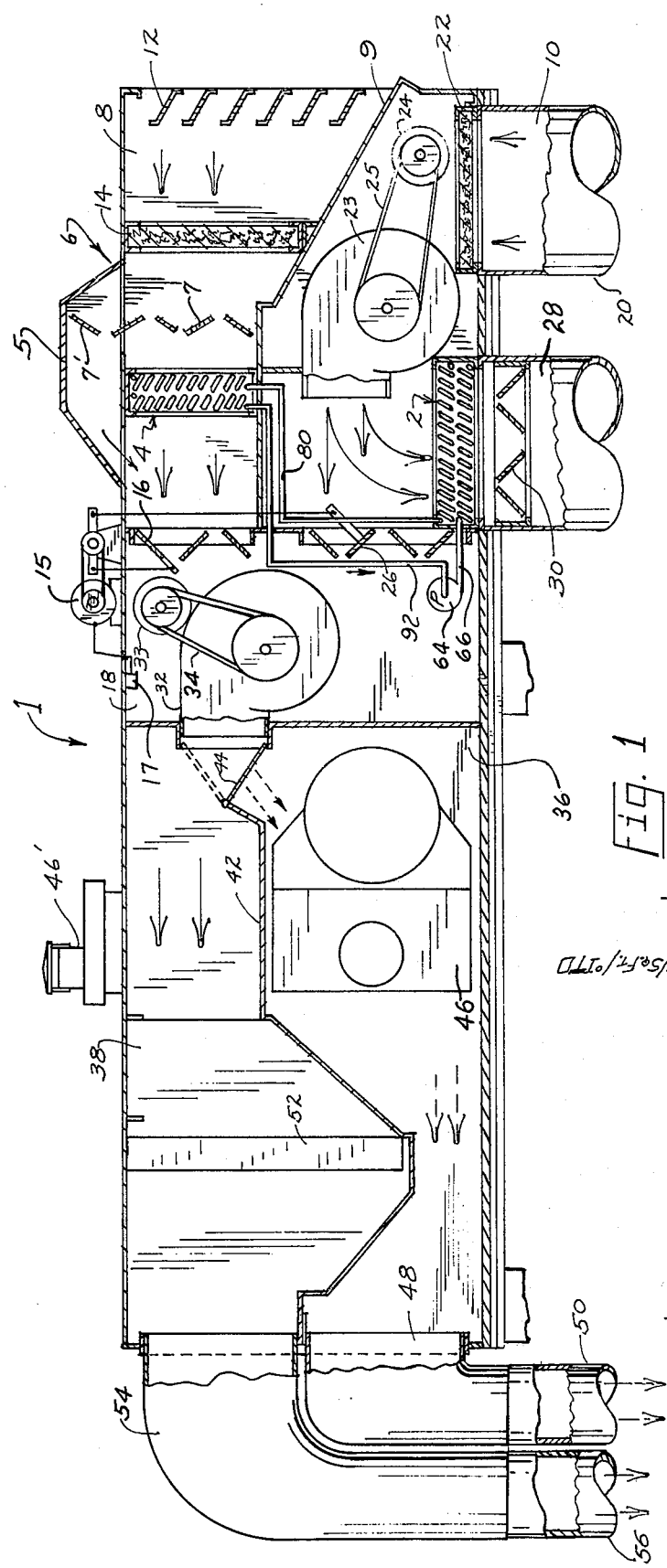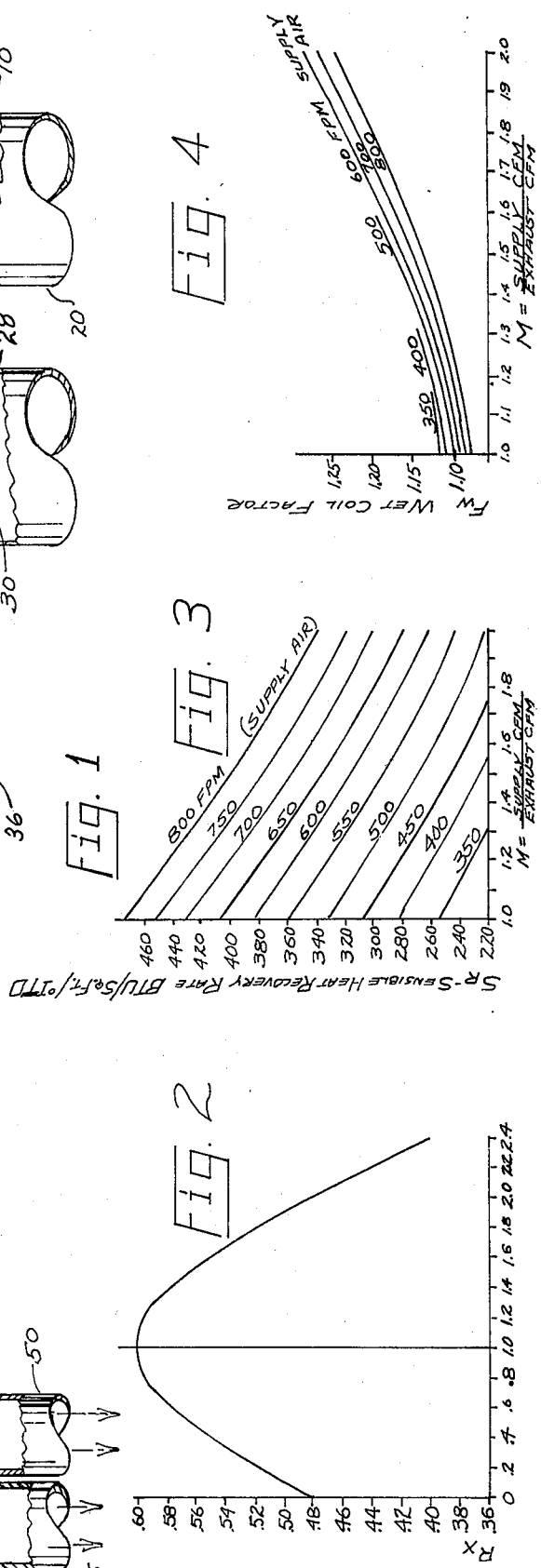

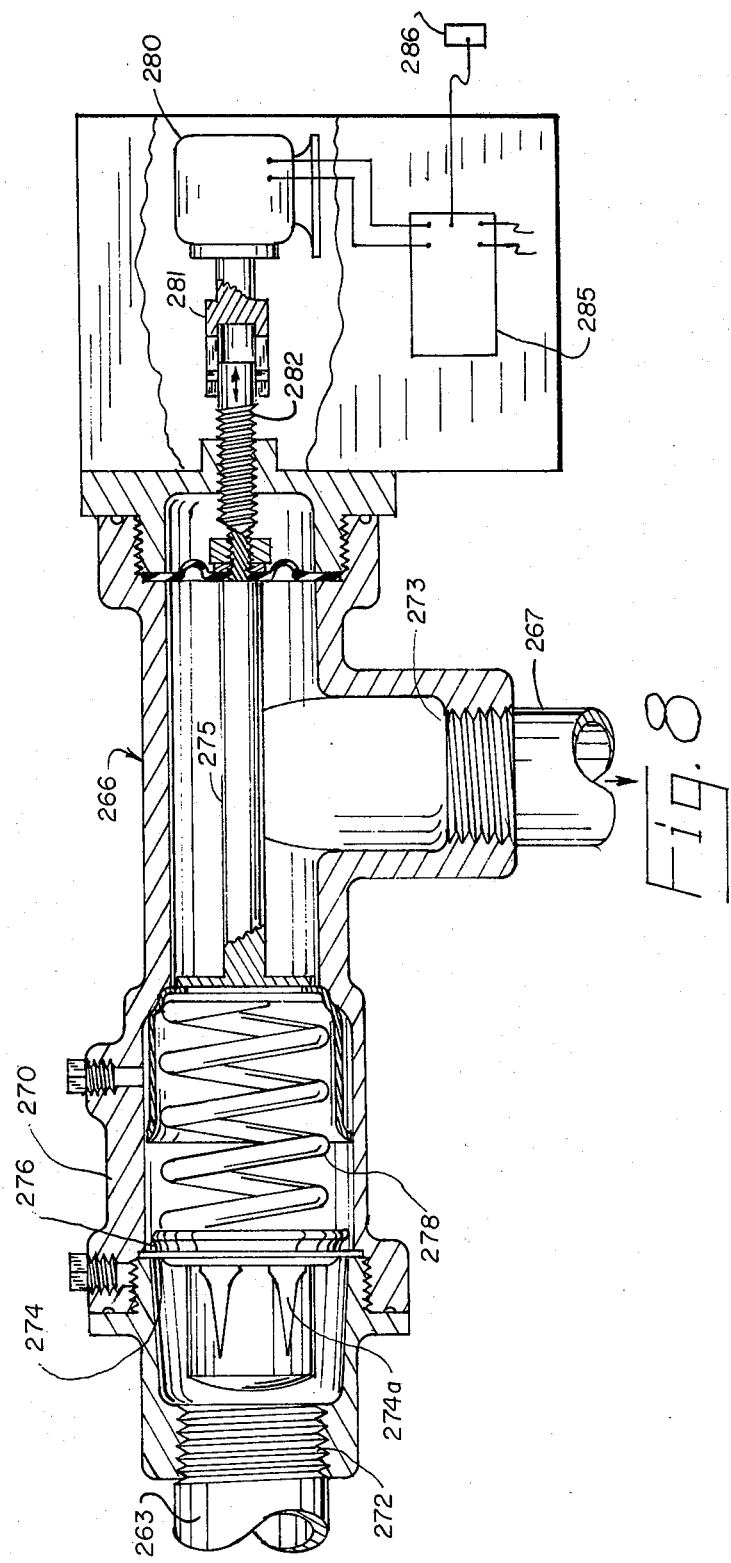

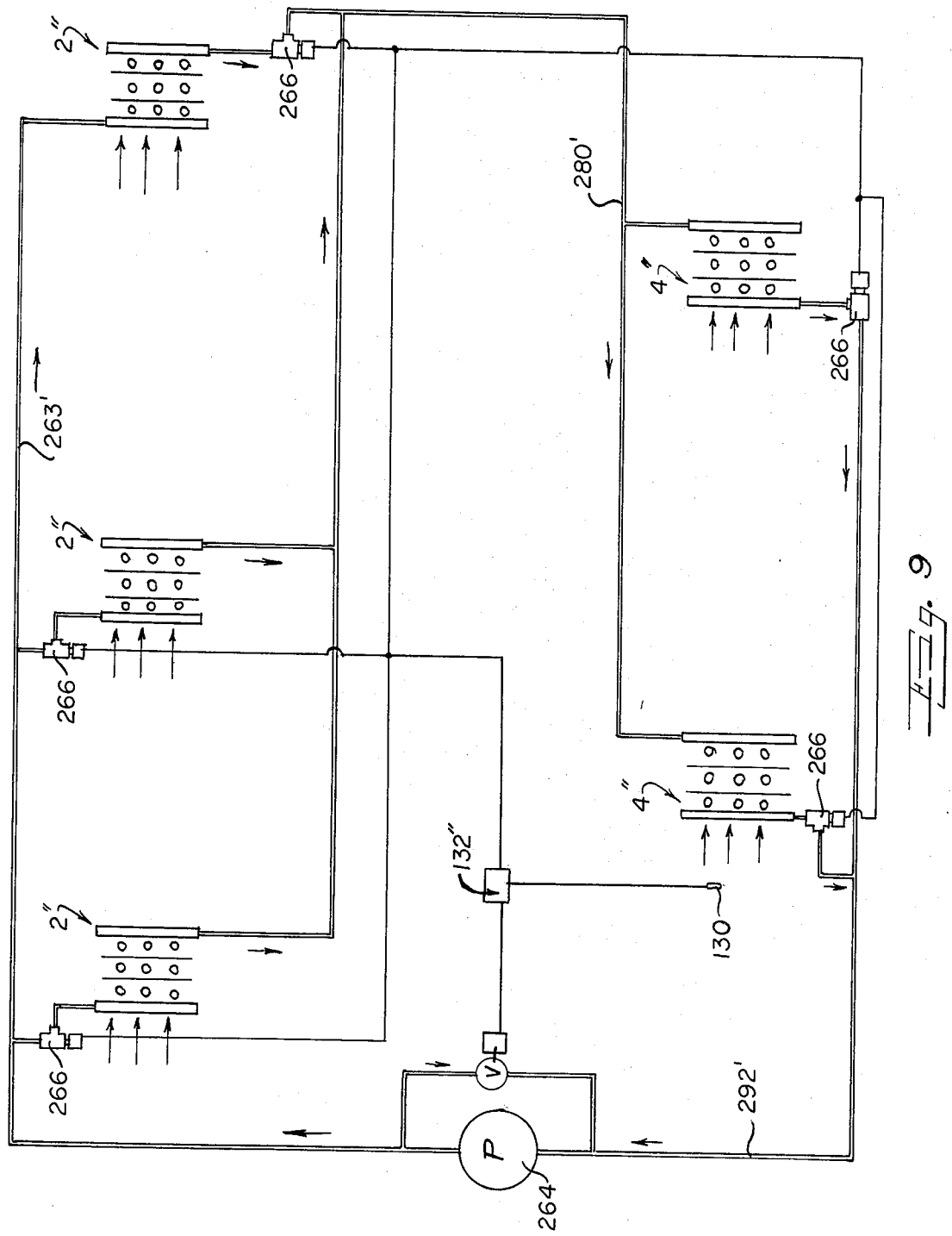

ENERGY RECOVERY SYSTEM

BACKGROUND

Air conditioning apparatus has been devised heretofore to artifically treat air in buildings to render the living conditions to persons within the building more confortable and heathful, or to ensure better conditions for the production and storage of products or materials.

Depending upon the environment at a specific installation, air conditioning generally involves temperature control, humidity control, ventilation and cleaning.

Heretofore, to provide ventilation, fresh air has been introduced into the building while foul or used air has been expelled or exhausted therefrom. When the outside air temperature was lower than the temperature at which air in the building was to be maintained, the fresh air, or a mixture of fresh air and return air from the building was heated. Consequently, air exhausted from the building was warmer than the fresh air drawn into the building resulting in loss of substantial energy from the facility.

During summer months when temperature outside the building was higher than the temperature to be maintained inside the building, the energy required for cooling the air, which was subsequently exhausted from the building, was wasted.

Regenerators have been employed in steam generating apparatus to reclaim some heat which would otherwise be lost from flue gas and transferring the heat to air required for combustion of fuel. Regenerators have also been used to extract heat from steam exhausted from a turbine and transferring the heat to feed water delivered to a boiler in an effort to minimize heat dissipation from the system.

Thermal regeneration devices have been employed heretofore to transfer heat between fresh air and exhaust air streams in conjunction with heating and air conditioning systems. However, such thermal regenerator apparatus has enjoyed only very limited success because the rate of heat transfer between the exhaust air and the fresh air has been very low and inconsistent.

SUMMARY OF INVENTION

I have devised an improved energy recovery system for use in ventilator systems wherein by continuous circulation of liquid through a first heat exchanger, located in the exhaust air stream, and through a second heat exchanger, located in the supply air stream, heat is transferred from the exhaust air to the supply air. Control apparatus is employed to vary the flow of liquid through the heat exchangers such that a maximum heat transfer rate between the exhaust air and the supply air through the transfer medium will be automatically maintained.

Means is provided in the circulation system for maintaining a mass flow rate of water, or other heat transfer medium, such that the mass flow rate of circulating liquid multiplied by its specific heat is equal to one-half the sum of the mass flows of all the air streams times the apparent specific heats to maintain optimum conditions for energy transfer between the exhaust air and the fresh intake air regardless of the mass flow rates of the respective air streams or changes in temperatures of the air streams or the circulating medium.

A primary object of the invention is to provide automatic control for maintaining flow of circulating liquid through heat exchangers in a regenerative air ventilation system such that maximum efficiency may be maintained during year around operation or may be reduced or eliminated as required.

Another object of the invention is to provide energy recovery apparatus in a ventilation system wherein a spray unit is provided in the exhaust air stream to spray air entering the exhaust unit and the heat exchanger therein to increase the transfer of heat from a refrigerated cooling coil to increase the cooling capability of a heat exchanger disposed in a supply air stream.

A further object of the invention is to provide regenerator apparatus for use in combination with conventional air conditioning systems having heat exchange units positionable at any desired location in intake and exhaust air streams to facilitate installation of an energy recovery system in existing units.

A still further object of the invention is to provide energy recovery apparatus to transfer heat to or from air exhausted from a building to minimize energy required to deliver fresh air into the building.

Other and further objects of the invention will become apparent upon referring to the detailed description hereinafter following and to the drawings annexed hereto.

DESCRIPTION OF DRAWING

Drawings of preferred embodiments of the invention are annexed hereto so that the invention may be better and more fully understood, in which:

FIG. 1 is a diagrammatic view of the energy recovery system associated with heating, cooling and ventilation apparatus;

FIG. 2 is a graphic representation of performance data;

FIG. 3 is a graphic representation for determination of sensible recovery rate;

FIG. 4 is a graphic representation illustrating effect of wetted coil surface;

FIG. 8 is a cross-sectional view of a flow control valve; and

FIG. 9 is a diagrammatic view of an energy recovery system associated with a ventilator system having multiple supply air and exhaust air units.

Numeral references are employed to designate like parts throughout the various figures of the drawings.

DESCRIPTION OF A PREFERRED EMBODIMENT

Figure 5:
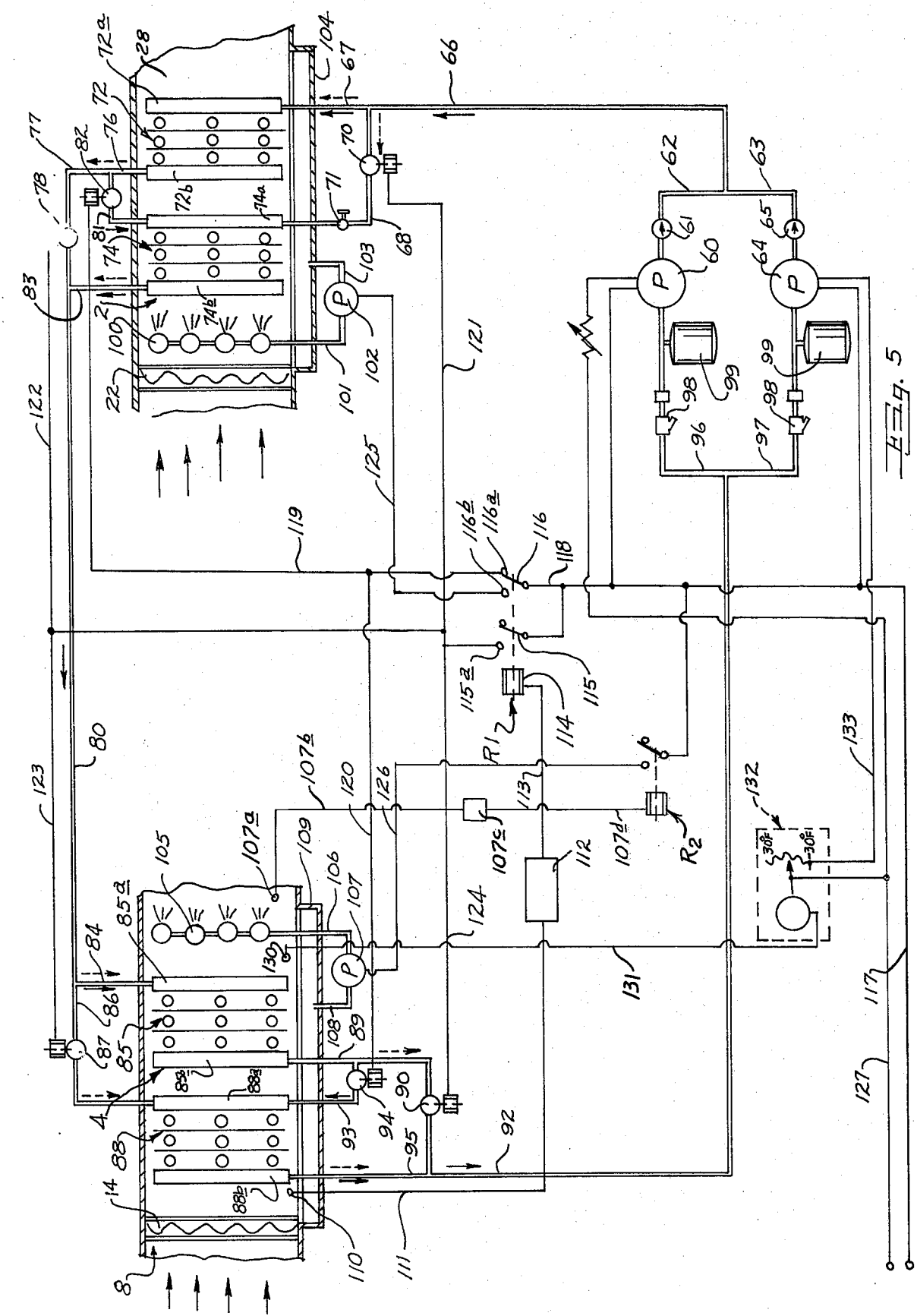
FIG. 5 is a diagrammatic view of a first embodiment of the energy recovery system.

Referring to FIG. 1 of the drawing the numeral 1 generally designates an air conditioning system having a first heat exchanger 2 located in an exhaust air passage and a second heat exchanger 4 located in a fresh air supply passage, heat exchangers 2 and 4 being connected by circuitry, as will be hereinafter more fully explain, to provide continuous recirculation of liquid to provide transfer of energy between exhaust air and fresh air.

The air conditioning system forms no part of the invention except in combination with the energy recovery apparatus associated therewith.

The air conditioning system 1 comprises an auxiliary air compartment 6 having a fresh air inlet passage 8 and a return air inlet passage 10. The fresh air inlet passage 8 has spaced louvers 12 across the inlet opening for deflecting rain and solid objects which might be drawn into the passage 8.

A fresh air filter 14 extends across the fresh air inlet passage for removing lint, dust, pollen, and the like from the fresh air stream. The quantity of fresh air drawn through inlet passage 8 is controlled by fresh air damper 16 in a passage communicating with mixing chamber 18 as will be hereinafter more fully explained.

A fresh air by-pass duct 5 has opposite ends communicating with fresh air inlet passage 8 on opposite sides of heat exchanger 4. Face and by-pass dampers 7 and 7' are mounted to control the proportion of fresh air which is permitted to pass around the heat exchanger 4. Dampers 7 and 9 preferably operate together, so that as one closes the other opens.

The return air passage 10 is connected to a return air duct 20 which communicates with one or more rooms in a building. A return air filter 22 is positioned to remove foreign matter from return air drawn through passage 10 by centrifugal type blower 23 driven by an electric motor 24 through a V-belt 25. Suitable baffling is provided for isolating the suction side of blower 23 from the discharge side and a partition 9 separates the fresh air inlet passage 8 from the return air passage 10.

A return air damper 26 is positioned across an opening between the return air passage 10 and mixing chamber 18.

The return air portion of auxiliary air compartment 6 has an exhaust air passage 28 having an exhaust air damper 30 mounted therein to control air exhausted therefrom to a suitable duct 31 communicating with the atmosphere outside of the building.

The air mixing chamber 18 has a centrifugal type blower 32 mounted therein driven by an electric motor 33 through suitable drive means such as V-belt 34.

Mixing chamber 18 is separated from heating compartment 36 and cooling compartment 38 by a partition 40 having an opening formed therein through which air is discharged from blower 32. Heating compartment 36 and cooling compartment 38 are separated by wall section 42 having a damper 44 positionable across the outlet passage from blower 32 for directing all of the air into the cooling compartment 38 when positioned as indicated in full outline in FIG. 1, or to direct all of the air into the heating compartment 36 when in the dashed outline position, or to direct a portion of the air into the heating compartment 36 and cooling compartment 38 when positioned intermediate the full line and dashed outlined positions.

The heating compartment 36 has a heating unit 46 for heating air flowing thereacross to a hot air plenum 48 connected by a duct 50 with the inside of the building.

A cooling element, preferably a cooling coil 52, is positioned for cooling air circulated through cooling compartment 42 to the cool air plenum 54 connected by duct 56 to the inside of the building.

Conventional thermostat control apparatus (not shown) is employed for starting and stopping blowers 23 and 32 to control flow of air to the inlet passage of the heating unit 46 and cooling unit 52. Baffle 44 is preferably motor driven for directing desired proportions of air delivered from blower 32 into heating compartment 36 and cooling compartment 38.

Fresh air damper 16 and return air damper 26 preferably operate in unison such that opening of damper 16 proportionately closes damper 26 to provide a desired proportion of fresh air and return air in mixing chamber 18. Fresh air damper 16 and return air damper 26 are preferably operated by a motor 15 controlled by an adjustable temperature sensing apparatus 17 to control temperature of air in mixing chamber 18. The exhaust air damper 30 preferably operates in unison with supply air damper 16 such that any desired mixture of fresh air and return air can be delivered into mixing chamber 18.

From the foregoing it should be appreciated that other and further heating or cooling units may be employed to accommodate specifications for a specific installation.

Heat exchanger 2 is positioned in heat exchange relation with air flowing through the exhaust passage 28 while heat exchanger 4 is positioned in heat exchange relation with air flowing through fresh air passage 8. As will be hereinafter more fully explained, if return air flowing through passage 10 is warmer than fresh air flowing through passage 8, heat will be absorbed in heat exchanger 2 and transferred from heat exchanger 4 to fresh air flowing through fresh air passage 8 thus reducing fuel required by heating unit 46 or any other heating apparatus inside the building to elevate the temperature of air delivered from mixing chamber 18 to a desired temperature level. However, if the temperature of fresh air delivered through passage 8 is greater than the temperature of air exhausted through exhaust passage 28, heat will be absorbed by heat exchanger 4 thereby reducing the temperature of fresh air and the heat will be transferred to the exhaust air thereby reducing energy required to operate cooling apparatus 52 to maintain the desired temperature level in the building.

Empirical data graphically illustrated in FIG. 2 illustrates that the maximum heat transfer or recovery rate occurs when the total mass flow rate of air flowing over the first and second heat exchangers in the system, multiplied by the apparent specific heat of air, equals twice the mass flow rate of the circulated liquid multiplied by the specific heat of the liquid.

The specific heat of a substance is the quantity of heat required to impart a unit increase in temperature to a unit mass of that substance.

"Apparent specific heat" as used herein is defined as the difference in enthalpy of air at saturation expressed in Btu per pound of dry air divided by the difference in dry bulb temperature of the air entering and leaving the exchanger.

Actual specific heat of dry air at atmospheric pressure at −20°F is 0.2397; at 20°F is 0.2398 and at 100°F is 0.2403. Thus, the actual specific heat of dry air is substantially constant over the temperature range normally encountered in heating and air conditioning at atmospheric pressure. The specific heat of saturated water at 32°F is 1.005, at 60°F is 1.00 and at 120°F is 1.00. Thus, the actual specific heat of saturated water is substantially constant within the range under consideration.

The specific heat of saturated air at 60°F is 0.244 and at 100°F is 0.2512. However, the temperature of cooling water sprayed into an air stream is reduced in part by the warming of the air, and in greater part by the evaporation of a portion of the water. Empirical data shows the "apparent" specific heat of the air passing through such a spray to be 0.81.

Thus, the heat transfer rate from the exhaust air through the wall of the heat exchanger coil increases substantially in relation to the transfer rate when the coil surface is dry.

Water has a viscosity (resistance offered by a fluid to relative motion of its parts) at 32°F of 1.792 centipoises; at 50°F of 1.308; and at 100°F 0.679. Thus, the mass flow rate of liquid circulated through a closed system by a constant speed centrifugal type pump is substantially less at a fluid temperature at 10°F than at a temperature of 100°F. Over the temperature range encountered between winter and summer air conditioning, the mass flow rate of fluid circulated by a constant speed pump may vary as much as 20% – 40%.

It should be appreciated that the auxiliary air compartments 6 having heat exchangers 2 and 4 mounted therein need not be a unitary construction and that heat exchangers 2 and 4 may be located at spaced positions about the building if it is deemed expedient to do so.

In the modified form of the invention illustrated in FIG. 9 three separate exhaust units 2 and two separate air intake units 4 are employed at spaced locations to provide desired ventilation.

It should further be appreciated that the auxiliary air compartment 6 having heat exchangers 2 and 4 mounted therein do not require mixing chamber 18, heating compartment 36, and cooling compartment 38 and can be operated independently as a ventilator apparatus if it is deemed expedient to do so.

Heat exchangers 2 and 4 are of conventional design and each preferably comprises two or more banks of finned, manifolded coils to heat and cool the supply and exhaust air streams.

A circulating system adapted to produce a high efficiency recovery rate and to maintain the high efficiency during year-round operation as climatic conditions vary is illustrated in FIG. 5 of the drawing.

A variable speed positive displacement pump 60 is connected through a check valve 61 to deliver fluid through line 62 which is connected with a pressure line 63 into which fluid flows from positive displacement pump 64 through check valve 65. Pressure lines 62 and 63 are connected through a suitable connector with supply line 66 for selectively delivering liquid through branch lines 67 and 68. Branch line 68 has a signal actuated valve such as solenoid actuated valve 70 mounted therein.

When solenoid actuated valve 70 is closed all of the flow from supply line 66 passes through branch line 67. However, when valve 70 is opened the flow is divided through lines 67 and 68. A balance valve 71 is preferably provided in branch line 68 to adjust the flow of fluid through the branch line.

Line 67 is connected through the manifold 72a of heat exchanger 72 while branch line 68 is connected to the manifold 74a of heat exchanger 74.

Line 76 from manifold 72b of heat exchanger 72 is connected through line 77 and solenoid actuated valve 78 to a line 80 through which liquid is delivered to bank 4 of heat exchangers. Line 81 from manifold 74a is connected through a solenoid actuated valve 82 to line 77 while line 83 from the manifold 74b of heat exchanger 74 is connected to line 80.

Solenoid actuated valves 70 and 78 are electrically connected to operate in unison and will be open when valve 82 is closed.

Line 80 is connected through line 84 to manifold 85a of heat exchanger 85 and through a line 86 and solenoid actuated valve 87 to manifold 88a of heat exchanger 88.

Manifold 85b of heat exchanger 86 is connected through line 89 and solenoid actuated valve 90 to return line 92.

Manifold 88a of heat exchanger 88 is connected through line 93 and solenoid actuated valve 94 to line 89 while line 95 is connected to manifold 88b and to return line 92.

Return line 92 delivers fluid through suction lines 96 and 97 to the suction side of pumps 60 and 64.

Suction lines 96 and 97 have conventional strainers 98 and balance tanks 9 associated therewith providing for expansion and contraction of liquid in the system and to maintain a positive pressure on the suction side of each of the pumps.

Each of the banks 2 and 4 of heat exchangers preferably has means associated therewith to spray liquid for controlling humidity of air flowing thereacross.

The bank 2 of heat exchangers has spray nozzles 100 connected through pipe 101 to a pump 102 which has a suction side connected through pipe 103 to a pan 104 positioned below heat exchangers 72 and 74. Suitable means (not shown) is preferably provided for maintaining a constant liquid level in pan 104. Such apparatus might include a float actuated valve connected to a water line to deliver water into the pan during summer months and an overflow device connected to a drain line to remove water from pan 104 during winter operation or during periods of high humidity.

Spray nozzles 100 in the exhaust passage 10 are arranged to spray liquid on the surface of heat exchangers 72 and 74.

After sprays are preferably provided in the supply air passage 8 and comprise spray nozzles 105 connected through pipe 106 and pump 107 having a suction line 108 communicating with pan 109 disposed below heat exchangers 85 and 88. Suitable means is provided for maintaining a substantially constant liquid level in pan 109 as hereinbefore described in relation to pan 104.

A temperature sensor 110 is connected through a line 111 to a conventional contactor box 112 for delivering a signal through line 113 to the coil 114 of relay R1. When poles 115 and 116 of relay R1 are in the normally open position an electrical circuit is completed from power line 117 through line 118, contact 116a and lines 119 and 120 to energize the solenoids of valve 82 and of valve 94 thus holding said valves in an open condition.

When the coil 114 of relay R1 is energized an electrical circuit is completed from pole 115 through normally open contact 115a to energize the coils of valves 70, 78, 87, and 90 through lines 121, 122, 123 and 124, respectively. As pole 116 of relay R1 moves from the normally closed contact 116a into engagement with the normally open contact 116b the solenoids of valves 82 and 94 are de-energized and a circuit is completed through line 125 to energize spray pump motor 102.

A temperature sensor 107a positioned in the supply air stream is connected through line 107b to a contactor box 107c for delivering a signal through line 107d to the coil of relay R2. When the coil of relay R2 is energized a circuit is completed from power line 117 through line 126 to energize the motor of pump 107.

To simplify FIG. 5 of the drawing the relay coils and spray pumps are illustrated as connected to ground rather than through a common conductor to power line 127.

Power lines 117 and 127 may be connected to any suitable source of electricity (not shown).

The control apparatus hereinbefore described is preferably calibrated such that during summer months of high temperature spray pumps 102 and 107 are energized and valves 70, 78, 87, and 90 are open while valves 82 and 94 are closed. Such operation provides parallel flow of liquid from circulation pumps 60 and 64 through the heat exchangers 72, 74, 85, and 88.

During winter months or when the temperature inside the building is higher than the outside temperature pumps 102 and 107 are preferably turned off and flow of liquid from circulation pumps 60 and 64 will be flowing in series through heat exchanger 72, valve 82 and heat exchanger 84 and in series through heat exchanger 85, valve 94 and heat exchanger 88.

Spray nozzles 100 spray water or other suitable liquid on the surface of heat exchangers 72 and 74 such that during the summertime when refrigerated air is being exhausted, the energy recovery can be increased substantially above the recovery rate from exhaust air flowing over dry coils. Spray pump 102 is preferably energized such that water is sprayed from spray nozzles 100 only when the exhaust air wet bulb temperature is lower than the fresh air dry bulb temperature.

Energization of pump 107 to spray water from spray nozzles 105 into the supply air stream 8 is optional. However, when pump 107 is energized during periods of low relative humidity as in dry climates sufficient cooling may be accomplished to completely eliminate the need for a refrigeration system.

A temperature sensor 130 is connected through conductor 131 to a motor speed control apparatus adapted to complete an electrical circuit to energize variable speed motor 64, for example, when temperature of supply air drops to 30°F. The speed of motor 64 is increased as the temperature of supply air decreases such that the combined output of pumps 60 and 64 is maintained to satisfy the requirements of optimum flow of liquid through the heat exchangers.

Thus, variable speed positive displacement circulation pump 60 would operate continuously at a fixed speed and during summer months or periods wherein the temperature of supply air is more than a predetermined temperature of, for example, 30°F. positive displacement circulation pump 64 would not be energized. However, as temperature of supply air drops to a predetermined level of for example, 30°F. circulation pump 64 would be energized and the speed would increase with reduction in temperature of supply air.

From the foregoing it should be readily apparent that temperature sensor 130 causes control apparatus 132 to deliver a signal through conductor 133 to drive pump 64 at a speed to maintain an optimum flow rate of liquid through heat exchangers 72, 74, 85, and 88 under year-round conditions. It should further be apparent that responsive to a signal delivered from control apparatus 112 when energized from a signal from temperature sensor 110 the spray systems are turned on and off and liquid flow through heat exchangers 72 and 74 is maintained in series or parallel to maintain optimum heat transfer rate.

While a plurality of pumps 60 and 64 are illustrated in FIG. 5 of the drawing, it should be appreciated that a single pump 64 may be employed if it is deemed expedient to do so.

Speed control device 132 may be a solid state electronic control adapted to control the speed of motor 64 or speed control device 132 may be of a mechanical type which is commercially available.

When the exhaust air spray pump 102 is running, pump 60 is either speeded up or a second pump 64 is brought into service to provide the necessary increase in liquid flow which may be as much as 2.2 times the base flow rate.

During winter operation, much condensate may be produced by the exhaust air unit and near saturated air exhausted. When this occurs, the apparent specific heat of the exhaust air will be increased and the maximum recovery rate will require an increase in the liquid flow rate. The sensor 110 in the supply air stream, or alternately a sensor in the liquid line 92 leaving the supply air bank of heat exchangers 4, will speed up pump 64 through the speed control 32 to provide the necessary increase in pump speed. Speed control apparatus 132 is preferably calibrated to either the supply air temperature or the liquid temperature to keep the system operating at maximum performance. That is, maintaining the ratio between supply air times the apparent specific heat plus exhaust air times the apparent specific heat equal to twice the mass flow rate of circulating liquid times the specific heat of the circulating liquid.

One of the factors which provides high recovery rate involves the velocity of liquid through line 80 between banks 2 and 4 of heat exchangers.

Heat exchangers 70, 74, 85, and 88 preferably have a plurality of relatively small copper tubes extending between manifolds to provide substantial area to facilitate transfer of heat from the air to the fluid flowing through the tubes. Such tubes are preferably copper or other suitable material having a high coefficient of heat transfer. However, errosion of tube walls begins when the velocity of fluid reaches approximately eight feet per second through the copper tubing.

To provide high velocity of liquid during dry operation and safe velocities when spray pump 102 is energized, heat exchangers 72 and 74 are connected, as hereinbefore described, so that the liquid flow can be parallel through exchangers 72 and 74.

The full line arrows illustrate flow through heat exchangers 72 and 74 for series flow while dashed arrows indicate the path and direction of liquid for parallel flow through heat exchangers 72 and 74.

In similar manner, in winter when higher liquid flow rates are required because of an increase in apparent specific heat caused by condensate on tubes of heat exchangers 72 and 74, valves 70, 76, and 78 are switched by the temperature control unit 112 to provide parallel liquid flow through heat exchanger 72 and 74.

FIG. 2 illustrated that maximum energy recovery occurs when the sum of the air flow times the respective apparent specific heats of the air across the heat exchangers is equal to two times the flow of liquid times the specific heat of the liquid.

To determine heat recovery for a given system the design specifications must be considered.

A typical installation might specify for summer operation 16,000 cubic feet per minute of supply air at 100°F dry bulb and 78°F wet bulb, and for winter operation 10°F. The system might exhaust 12,000 cubic feet per minute exhaust air at 75°F dry bulb and 62.5°F wet bulb during summer operation and during winter operation.

For installation in an existing air conditioning system it is assumed that a heat exchanger having surface areas of twenty-four square feet will develop desired air velocities of 667 feet per minute for supply air and 500 feet per minute for exhaust air.

To determine the sensible recovery rate (SR) the supply air velocity is divided by the exhaust air velocity. Entering FIG. 3 at M equals 1.3 and moving upward to 667 feet per minute then to the left SR is equal to 367 Btuh/square feet/degree initial temperature difference (degree ITD).

For the specified system here under consideration it is assumed that temperature change in the inner connecting piping 66, 80, 92, has been determined and that the pipe loss factor $F_p$ is equal to .996.

For summer operation ITD (initial temperature difference) is equal to 100° minus 75° which is equal to 25°F. The energy recovery for such a system would be equal to the sensible recovery rate (SR) times the face area times the initial temperature difference (ITD) times the interconnecting pipe loss factor ($F_p$).

Thus, the total recovery would be equal to 367 × 24 × 25 × 0.996 which is equal to 219,320 Btuh. This is equivalent to 18.25 tons; therefore, the size of the refrigeration system for summer operation can be reduced by this amount if maximum energy recovery is maintained.

For winter operation the initial temperature difference is equal to 75°F dry bulb — (+10°F dry bulb) equals 65°F.

Since moisture will be condensed from the exhaust air stream, the recovery rate will be increased. Entering FIG. 4 at M is equal to 1.33 and moving upward to 667 feet per minute and reading the wet coil factor, $F_w$ equals 1.12.

The total recovery is equal to $S_R \times F_w \times$ coil face area $\times$ ITD $\times F_p$ which is equal to 367 × 1.12 × 24 × 65 × .996 which is equal to 638,700 BTU hours.

The temperature rise in supply air is equal to 638,700 Btuh divided by 16,000 cfm × 1.08 which is equal to 37°F. The final temperature of the supply air is therefore equal to 10°F plus 37°F which is equal to 47°F.

For winter recovery at 10°F supply air 100 gallons per minute of liquid is circulated to provide 638,700 Btuh. By increasing the liquid flow rate to 130 gallons per minute, the recovery rate increases to 650,700 Btuh.

For summer recovery at 100° dry bulb and 66.3° wet bulb supply air using sprays in the exhaust unit the optimum flow rate is 225 gallons per minute yielding a recovery of 219,320 Btuh. If the flow rate were kept constant at 100 gallons per minute, the recovery would have been 150,000 Btuh.

SECOND EMBODIMENT

Figure 6:
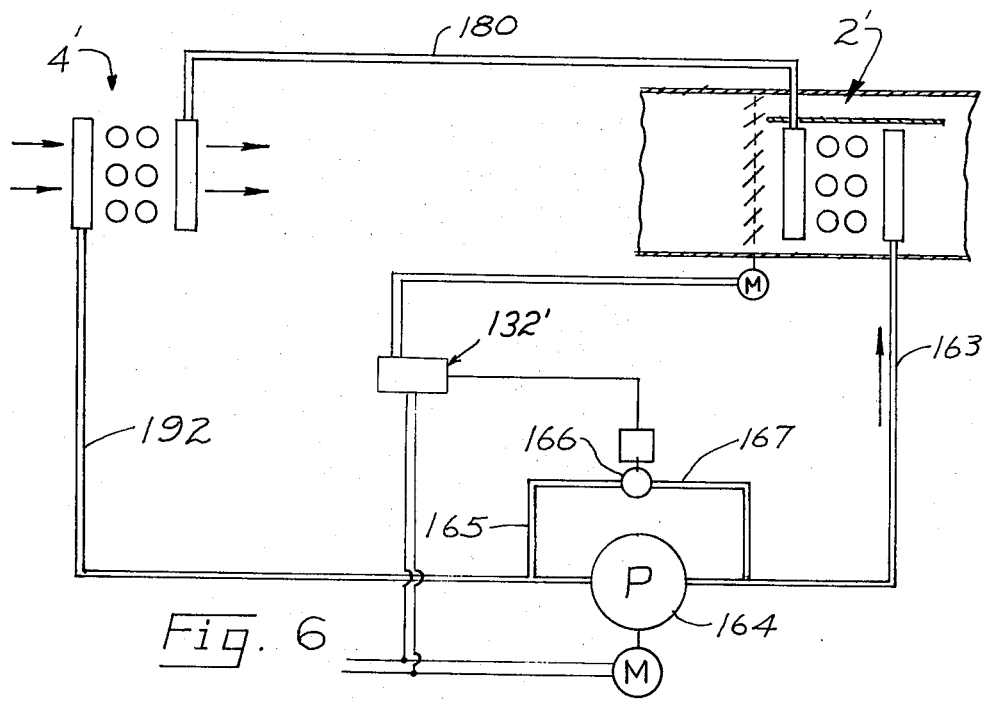
FIG. 6 is a diagrammatic view of a second embodiment.

A second embodiment of the apparatus for controlling flow through the heat exchangers is illustrated in FIG. 6 of the drawing wherein a positive displacement pump 164 is connected through a pressure line 163 to heat exchanger 2'. Heat exchanger 2' is connected through line 180 to heat exchanger 4' which is connected through suction line 192 to the suction side of pump 164.

A fluid by-pass line 165 is connected to suction line 192 and is connected through a flow control valve 166 and line 167 to the pressure line 163. The flow control valve 166 is preferably installed to modulate the flow rate of the circulating liquid which in turn controls the recovery rate of the system with a constant speed pump 164.

For example, during the summer, spring and fall seasons a predetermined amount of liquid is by-passed through flow control valve 166. As the supply air temperature decreases, the amount of liquid circulated through flow control valve 166 is reduced thereby maintaining the system at peak recovery at all temperatures of supply air. It should further be noted that when exhaust sprays 100 illustrated in FIG. 5 are not in use liquid is preferably by-passed through flow control valve 166. However, when exhaust sprays are employed, valve 166 is closed such that no liquid is by-passed and the system is brought to peak efficiency.

It should be appreciated that if it is deemed expedient to do so line 167 may be connected to line 180 rather than to line 163 to permit tailoring of recovery of any segment of a multi-bank system.

THIRD EMBODIMENT

Figure 7:
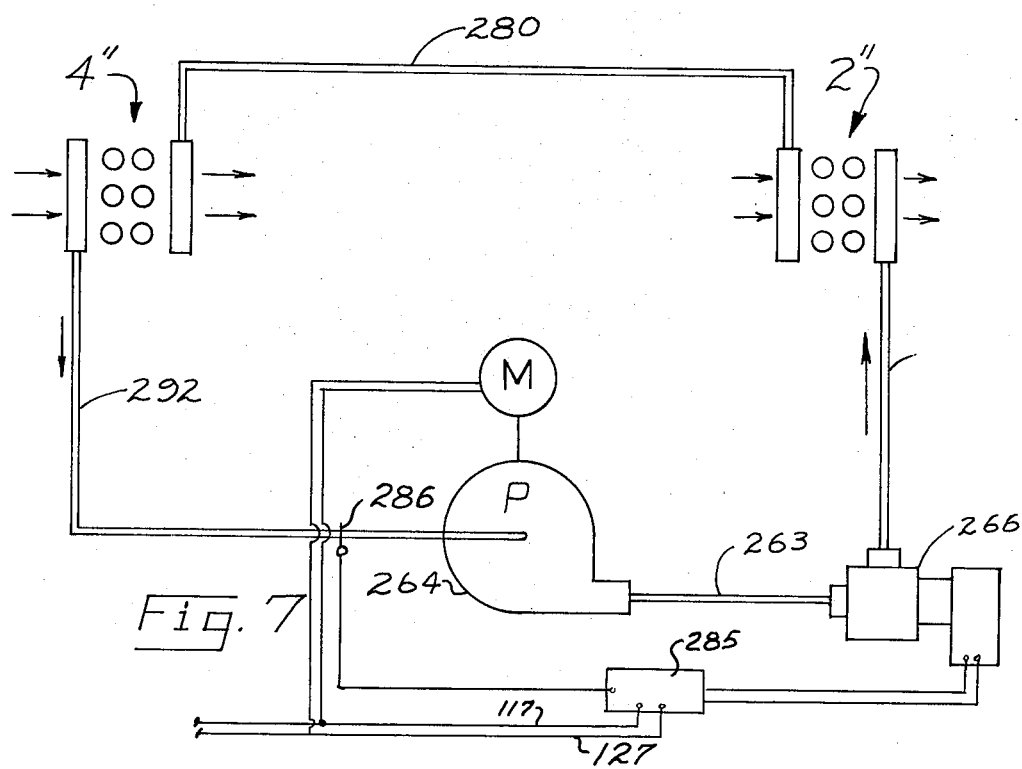
FIG. 7 is a diagrammatic view of a third embodiment.

A third embodiment of the invention is illustrated in FIG. 7 and 8 of the drawing wherein a constant speed centrifugal pump 264 is connected to a pressure line 263 which delivers fluid to the inlet passage of flow control valve 266 which discharges fluid through line 267 to a heat exchanger 2''. Heat exchanger 2'' discharges fluid through line 280 to heat exchanger 4'' connected to suction line 292 connected to the suction side of pump 264.

Flow control valve 266 as illustrated in FIG. 8 of the drawing and comprises a valve body 270 having an inlet passage 272 and an outlet passage 273. The valve element 274 on a rising stem 275 is urged toward seat 276 for controlling flow through the outlet passage 273.

A spring 278 is disposed between rising stem 275 and cupshaped valve element 276 such that for a given position of stem 275 the flow through outlet passage 273 is constant. As the pressure drops across valve element 274 increases the valve element 266 moves to reduce the area of the flow passage 274. As the pressure drop decreases spring 278 moves the valve element 274 to expose additional orifice area 274a.

The position of stem 275 is controlled by motor 280 having a splined drive shaft 281 for rotating a threaded stem 282 which is maintained in pressure engagement with the end of stem 275 by force exerted by spring 278. Suitable apparatus such as thermostat control apparatus 285 having a temperature sensor 286 is positioned for sensing the temperature of supply air, or temperature of circulating fluid or the position of supply air dampers as hereinbefore described such that the flow rate of fluid through outlet passage 273 is maintained to provide optimum heat exchange between the banks 2' and 4' of heat exchangers as hereinbefore described.

The recovery systems illustrated in FIGS. 7 and 9 are substantially the same except that in FIG. 9 three separate exhaust units 2'' and two separate supply air units 4'' are connected through valves 266 to control flow through the respective units. The flow is controlled by sensor 130' in the supply air stream.

From the foregoing it should be readily apparent that the three embodiments of the invention hereinbefore described accomplish the objects of the invention hereinbefore enumerated.

It should be further appreciated that flow control apparatus other than that hereinbefore described in the preferred embodiment from my invention may be devised to maintain the flow through banks 2 and 4 of heat exchangers such that optimum heat transfer will be maintained during year arouund operation of the ventilation apparatus.

Having described my invention, I claim:

1. A method of recovering maximum energy from air exhausted from an enclosure comprising the steps of: delivering air from inside the enclosure through an exhaust passage to the outside of the enclosure; delivering fresh air from the outside the enclosure through an inlet passage to the inside of the enclosure; positioning a first heat exchanger in the inlet passage; positioning a second heat exchanger in the outlet passage; circulating liquid in a closed circuit through the first and second heat exchangers to transfer maximum energy between the inlet and outlet passages; and maintaining the mass flow rate of the liquid substantially equal to one-half the sum of the mass flow rates of all the air flowing over the first and second heat exchangers multiplied by the apparent specific heat of the respective air streams and divided by the specific heat of the liquid to maintain a maximum heat transfer rate from air exhausted from the enclosure to fresh air.

2. The method of claim 1 with the addition of the step of: spraying water on the heat exchanger in the exhaust passage to change the apparent specific heat of air delivered through the exhaust passage.

3. The method of claim 1 with the addition of the steps of: sensing temperature of fresh air flowing out of the heat exchanger in the inlet passage; and by-passing a portion of the fresh air around the heat exchanger in the inlet passage in response to changes in temperature of the fresh air.

4. The method of claim 1 with the addition of the steps of: sensing temperature of the liquid; and bypassing a portion of the fresh air around the heat exchanger in the inlet passage to regulate the amount of energy transferred between the first and second heat exchangers.

5. A method of ventilating an enclosure, wherein air in the enclosure is cooler than air outside of the enclosure, comprising the steps of: delivering fresh air from outside the enclosure over a first heat exchanger; sensing temperature of the fresh air after the fresh air has passed over the first heat exchanger; exhausting air from the inside the enclosure over a second heat exchanger; circulating liquid in a single state in a closed circuit through the first and second heat exchangers; spraying liquid on the outer surface of the second heat exchanger; and changing the mass flow of the liquid circulating through the first and second heat exchangers upon change of the apparent specific heat of the fresh air to maintain maximum energy recovery.

6. A method of recovering maximum energy from air exhausted from an enclosure comprising the steps of: delivering fresh air from outside the enclosure over a first heat exchanger into the enclosure; delivering exhaust air from inside the enclosure over a second heat exchanger to the outside of the enclosure, said second heat exchanger being spaced remotely from said first heat exchanger; circulating liquid in a closed circuit through the first and second heat exchangers such that heat is transferred from air to the circulating liquid at one of the heat exchangers and heat is transferred from the circulating liquid to air at the other heat exchanger; maintaining the mass flow rate of the liquid substantially equal to one-half of the sum of the mass flow rate of the air flowing over the first heat exchanger multiplied by the apparent specific heat of the fresh air plus the mass flow rate of air flowing over the second heat exchanger multiplied by the apparent specific heat of the exhaust air, wherein the apparent specific heat of air flowing over each heat exchanger is equal to the difference in enthalpy of the air at saturation expressed in BTU per pound of dry air, divided by the difference in the dry bulb temperature of the air entering and leaving the heat exchanger.

7. The method of claim 6 with the addition of the steps of: spraying liquid on the exterior of the second heat exchanger to increase the apparent specific heat of exhaust air delivered from inside the enclosure to the outside of the enclosure.

* * * * *